United States Patent Office 3,119,716
Patented Jan. 28, 1964

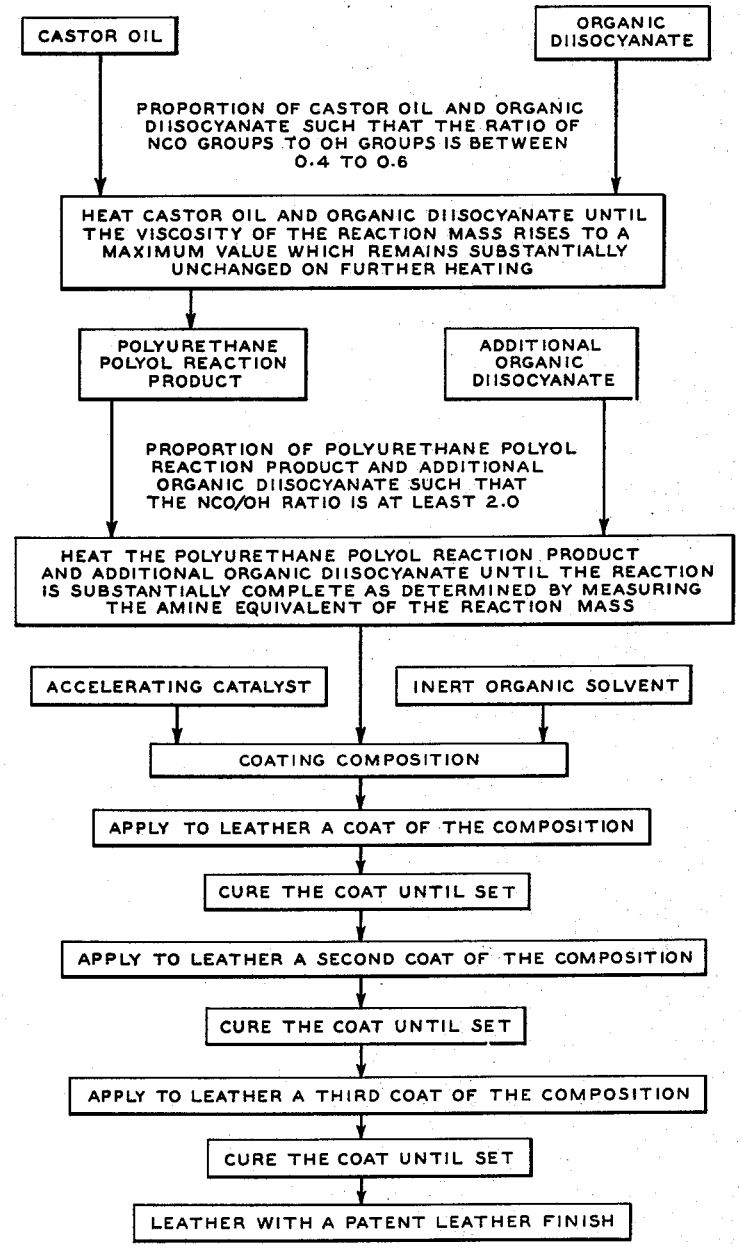

3,119,716
PATENT LEATHER FINISHES
George S. Wooster, Hamburg, N.Y., assignor to Allied
Chemical Corporation, New York, N.Y., a corporation
of New York
Filed Aug. 1, 1960, Ser. No. 46,326
4 Claims. (Cl. 117—142)

This invention relates to patent leather finishes and more particularly refers to a new and improved coating composition for use as a patent leather finish and method of producing such composition.

Prior art coating compositions containing polyurethane polyisocyanate film-formers prepared from castor oil and organic diisocyanates penetrate leather when applied thereto as a prime coat and, when cured, tend to stiffen the leather and to crack or craze if the leather is flexed very much. Accordingly, such coatings are not suited for the preparation of quality patent leather finishes although they are satisfactory for some other leather coating applications.

The film-forming components of such prior art coatings were prepared by a process wherein all of the diisocyanate reactant was added to the castor oil as a single charge. The proportions of reactants were such that the NCO/OH ratio (i.e. ratio of isocyanate groups to hydroxyl groups in the reactant charge) was between about 1.75 and 2.25. Such products appear to be mixtures having a relatively low average molecular weight and comprising predominantly adducts of organic diisocyanates and castor oil, adducts of organic diisocyanate and a diurethane in which two castor oil residues are linked together by an organic diisocyanate residue and excess unreacted diisocyanate. The production of polyurethane polyisocyanates by using reactant proportions corresponding to lower NCO/OH ratios of the order of 1.25 to 1.5 results in products which tend to be very unstable on storage, i.e. they will thicken and gel, particularly in the presence of water and other impurities which are very difficult to eliminate in commercial practice. Thus, referring to such prior art coatings, H. H. Metz et al. have observed that "Reducing the (NCO/OH) ratio to 1.5 or 1.25 adversely affected the stability and performance properties of the prepolymer coatings" (121 Paint, Oil and Chemical Review, April 17, 1958, page 8).

The accompanying drawing is a flow sheet illustrating the present invention.

An object of the present invention is to provide a coating composition eminently suitable for patent leather finish, which will seal the surface without undue penetration, will not stiffen the leather appreciably, will not crack or craze upon prolonged flexing, is tack-free, abrasion-resistant, water-resistant, solvent-resistant and further characterized by an aesthetically pleasing depth of gloss.

Furthermore, the coating composition of the present invention in addition to giving the above-enumerated desirable properties of patent leather finishes is reproducible in composition and properties, and stable in storage despite the fact that the film-forming components are in a relatively higher average molecular weight range associated with instability in the case of prior art products.

The film-forming components of the coating compositions of the present invention are prepared by a two-stage process as follows:

(1) Heating a mixture of castor oil and organic diisocyanate in such proportions that the ratio of NCO groups to OH groups in the reactants is between 0.4 and 0.6, until the viscosity of the reaction mass rises to a maximum value which remains substantially unchanged on further heating, to obtain a polyurethane polyol reaction product.

(2) Heating this polyurethane polyol with additional organic diisocyanate, in such amount that the NCO/OH ratio of the polyurethane polyol-organic diisocyanate mixture is at least 2.0, until the reaction is substantially complete (as may be determined by measuring the "amine equivalent" of the reaction mass by a method hereinafter described).

Preferably, the reaction mixtures in which the polyurethane polyol and polyurethane isocyanates are prepared are thinned with enough solvent to maintain the fluidity required for good mixing. However, solvent much in excess of this amount is not preferred because it is desired to obtain a product having a high concentration of film-former, e.g. 65% or more non-volatiles content. This makes it possible to use the same lot of concentrated product for formulating prime, second and top coats. Prime and second coats are best prepared by cutting the film-former concentrate with volatile solvents that may be readily evaporated to minimize penetration of the film-former into the leather. The top coat, however, is best prepared by cutting the film-former concentrate with a higher boiling solvent to assure good flow properties. Solvent used to thin the reaction masses is preferably intermediate in volatility between that used to prepare the prime and second coats and that used to prepare the top coat.

The coating composition of the present invention is best prepared, packaged and stored as a film-former concentrate. Prior to use it is diluted with solvent in an amount that will vary depending on the properties of the solvent and substrate. Before application, the composition is charged with catalyst to accelerate the film-forming reaction and, if desired, a dye. Preferably, the coatings are applied with a spray gun. The coatings are cured by heating to vaporize solvent and accelerate the film-forming reactions.

The polyurethane polyol is prepared by reacting castor oil and organic diisocyanate in such proportions that the ratio of NCO to OH groups in the reactants is between 0.4 and 0.6. The reactants are heated together, preferably in the presence of a solvent, until the reaction is substantially complete, as evidenced by the fact that the reaction mass attains a maximum viscosity which remains substantially constant on further heating. The reaction products are believed to consist predominantly of open chain polyurethane polyols substantially free of unreacted isocyanate groups and containing, per molecule, $n$ castor oil residues, $n-1$ organic diisocyanate residues, $2n-2$ urethane linkages, wherein $n$ has a calculated average value ranging from about 2 (at an NCO/OH group reactant ratio of 0.4) to about 5 (at an NCO/OH ratio of 0.6). (These values of $n$ are calculated on the assumption, in accord with prevailing authoritative opinion, that commercial castor oil is a mixture containing 70% trifunctional glyceride (glycerine triricinoleate) and 30% difunctional glyceride (glycerine diricinoleate monooleate or mono linoleate). If pure glycerine triricinoleate were used, or were the only functional component of the castor oil, the calculated range of values for $n$ would be from 2.5 to 10.) Polyurethane polyols prepared at NCO/OH ratios below 0.4 yield, when reacted with additional diisocyanate, film-formers of relatively low molecular weight which penetrate leather and, upon curing, yield stiff coatings; those prepared at NCO/OH ratios above 0.6 tend to be unstable, particularly in the presence of impurities. Preferably the polyurethane polyols are prepared at an NCO/OH ratio of about 0.5. The average value of $n$ characterizing the reaction products at this NCO/OH ratio is about 3.

The polyurethane polyisocyanate film-forming component is then prepared by heating the polyurethane polyol with additional organic diisocyanate, preferably in the presence of additional solvent, until the reaction is substantially complete, as may be determined by measuring the "amine equivalent" of the batch in accordance with a method hereinafter described. The amount of additional organic diisocyanate should be sufficient to provide at least 2.0 isocyanate groups for each free hydroxyl group in the polyurethane polyol. This will increase the total NCO/OH ratio, based on the total organic diisocyanate and castor oil raw materials, to a minimum value within the range of 1.6 to 1.4, which corresponds to the range of 0.4 to 0.6 for the NCO/OH ratio for the reactants used in preparing the polyurethane polyol intermediate. The reaction products are believed to consist predominantly of open chain polyurethane polyisocyanates substantially free from unreacted hydroxyl groups and containing, per molecule, $n$ castor oil residues, where $n$, as before, has an average value ranging from 2 to 5 depending on the NCO/OH ratio (in the range 0.4 to 0.6) characterizing the polyurethane polyol used.

Preferably the amount of organic diisocyanate used to prepare the polyurethane polyisocyanate is in excess of the above-specified minimum amount which provides 2.0 isocyanate groups per hydroxyl group present in the polyurethane polyol. The excess remains in the product as surplusage but its presence helps to assure completeness of reaction. It also acts as a scavenger to remove traces of water and other impurities and may serve as a cross-linking agent during the curing process in the applied coating. While there is no particularly significant or critical upper limit on the total amount of isocyanate used in the present process, it should not be necessary or desirable to use more than corresponds to an NCO/OH ratio of 2.0 based on the total castor oil and organic diisocyanate raw materials. Accordingly the NCO/OH ratio, based on the total raw materials, characterizing the coating compositions of the present invention may vary between 1.4 and 2.0 depending on (1) the NCO/OH ratio (in the range 0.4 to 0.6) characterizing the polyurethane polyol, and (2) the amount (if any) of isocyanate used in excess of the theoretical amount. It is generally preferred to react the polyurethane polyol intermediate with an amount of organic diisocyanate sufficient to provide 2.2 or 2.3 isocyanate groups for each hydroxyl group present.

The better commercial grades of castor oil are satisfactory for use in this invention. The moisture content should be less than 0.1%.

Organic diisocyanates suited for making the formulation include, among many others, 2,4- and 2,6-tolylene diisocyanates, diphenylmethane-4,4'-diisocyanate, 1-chlorphenylene-2,4-diisocyanate, para and metal phenylene diisocyanates, hexamethylene diisocyanates, 3,3-bitolylene-4,4'-diisocyanate and 1,5-naphthalene diisocyanate. Tolylene diisocyanates are preferred.

Solvents used in the coating compositions of the present invention should be substantially free of active hydrogen as determined by the Zerewitnoff method (cf. Kohler et al., 40 J. Am. Soc. 3181–8 (1927). Such reactive hydrogen (e.g. the hydrogen present in hydroxyl groups, carboxyl groups, primary and secondary amino groups, etc.) would react with the free isocyanates present in the reactants or reaction products. Suitable solvents include toluene, xylene, various petroleum hydrocarbon distillate fractions, isopropyl ether, ethyl acetate, methyl ethyl ketone, cyclohexanone and various mixtures thereof. The principal function of the solvent during the manufacturing operations is to reduce the viscosity of the batch so that good mixing may be obtained. For the prime and secondary coats, a rather volatile solvent is preferred to minimize penetration of the film-forming material into the leather. The top coat on the other hand is preferably formulated with a higher boiling solvent to obtain better flow properties.

The reaction of castor oil and organic diisocyanate is effected at an elevated temperature, generally of the order of 60–150° C. Preferably, the polyurethane polyol is prepared by adding the diisocyanate to hot (70–100° C.) castor oil which is being agitated under a dry inert atmosphere, e.g. nitrogen gas. Solvent is added as needed; an amount sufficient to make a product having a non-volatile concentration of 85 to 90% is usually all that is required at this stage. The batch is agitated at 90–120° C. during several hours until the viscosity attains a maximum value which remains substantially unchanged during further heating for, say, an additional half hour. The product is then cooled. It may be converted directly to polyurethane polyisocyanate as described below, or, if desired, it may be stored indefinitely in a dry environment.

Reaction of polyurethane polyol with diisocyanate is effected generally at a temperature of about 30–100° C. Preferably the polyurethane polyisocyanate is prepared by adding the additional diisocyanate to warm (circa 30° C.) polyurethane polyol solution which is being agitated under dry nitrogen. Solvent is added as needed; an amount sufficient to make a product having a non-volatile concentration of about 65% is usually all that is required at this stage. The batch is then heated at circa 60° until the reaction is substantially complete, which usually takes 2–4 hours. The product may be packed out and stored indefinitely in clean dry containers.

The reaction may be considered complete if the measured "amine equivalent" of a sample of the batch is within 10% of the theoretical value. By "amine equivalent" is meant the weight of a portion of the batch which contains 1 equivalent weight of isocyanate, the weight units being consistent. It is determined by an analytical procedure involving a reaction between isocyanate and n-dibutyl amine to form the corresponding urea and backtitrating excess n-dibutylamine with HCl solution. The theoretical amine equivalent is given by the expression:

$$AE = WB / n(NCO) - n(OH)$$

wherein
AE = amine equivalent
WB = weight of batch
$n(NCO)$ = number of equivalent weights of isocyanate (total) charged to process
$n(OH)$ = number of equivalent weights of hydroxyl (castor oil) charged to process.

If the measured value of the amine equivalent is below the theoretical, it signifies that reaction between the hydroxyl groups and isocyanate groups present in the batch is incomplete. If the measured value is above the theoretical, it signifies that some of the isocyanate charged to the process has been consumed in side reactions such as reactions with water or other impurities containing reactive hydrogen.

The amine equivalent is determined as follows: weigh 6 to 8 grams of sample, dilute with 35–50 cc. of C.P. toluene, add 20 cc. of a 2 N solution of dibutylamine in C.P. toluene, heat 5 to 10 minutes do (not boil), cool, add 100 cc. methanol, add 10 drops of Bromphenol Blue indicator solution, titrate with 1 N HCl to the disappearance of blue color, run a blank. The value of the measured amine equivalent is calculated by the equation.

$$AE = \frac{1000 WS}{(TB - TS)N}$$

WS = weight of sample in grams
TB = titration of blank in ml. HCl
TS = titration of sample in ml. HCl
N = normality of HCl The analytical procedure is similar to American Society for Testing Materials method D–1638–59T for assaying tolylene diisocyanate which is described on pp. 100–102 of the "1959 Supplement to Book of ASTM Standards Including Tentatives, Book Nine."

Preferred catalysts for accelerating the film-forming reaction are dibutyl tin dilaurate, methyl diethanolamine, or mixtures thereof. Other suitable catalysts are, in general, bases, particularly nitrogen-containing organic bases such as tertiary amines, e.g. dimethyl ethanolamine, triethylenediamine, N-methyl morpholine, diethyl cyclohexylamine, 3-methylisoquinoline, adipic acid diester of diethylaminoethanol, etc. Also operative are soluble lead and cobalt salts, e.g. naphthenates. The amount of catalyst used will vary according to the reactivity of the formulation, the activity of the catalyst, the rate of cure desired and the minimum "pot life," desired for the catalyzed formulation. If a dibutyl tin dilaurate catalyst is used, the recommended concentration is 0.1 to 0.3% by weight on the non-volatiles in the formulation. About 1 to 2% (same basis) of methyl diethanolamine is required for equivalent catalytic activity. The pot life of the formulation (period before the formulation gels to a point where it is no longer useful) varies with the amount and activity of the catalyst used.

Dyes suitable for use in the formulation include oil soluble azo black dyes such as Colour Index Solvent Blacks No. 3 and No. 12. About 0.2 weight percent of dye based on the non-volatiles is recommended. The dye is best applied in the prime coat and may also be applied in the second coat. It is preferred that the top coat be clear because this prevents the dye from bleeding from the finish.

Preferably the prime coat is sprayed as a mist onto the leather under an air pressure of about 15 p.s.i.g. at the gun. Only enough should be applied to form a continuous wet film because bubbles may be trapped in a heavy film. The prime coat is cured until set, i.e. for 2 to 20 hours at 50–60° C. It is not necessary for the prime coat to become tack-free before the second coat is applied.

The second coat is applied as described above for the prime coat except that color may be omitted if a satisfactory uniform color has been developed in the prime coat. For some leather substrates it may be possible to omit the second coat if the surface of the leather is completely sealed by the prime coat.

The coating compositions and process of the present invention produce patent leather finishes having the following combination of highly desirable properties.

| | |
|---|---|
| Set time | 1–4 hours. |
| Dry time | 16–24 hours. |
| Flex | Excellent—may be flexed for 10,000 to 20,000 cycles without failure |
| Break | None or little. |
| Water resistance | No failure after 10 minutes in boiling water. |
| Solvent resistance | No failure after 6 hours in acetone. |
| Bleed resistance | Excellent. |
| Depth of gloss | Excellent. |
| Hand or softness | Excellent. |
| Single flex at −20° C | Pass, no cracking. |
| Adhesion | Excellent. |

For the top coat it is recommended to reduce the polyurethane polyisocyanate to 35–40% non-volatiles concentration with a higher boiling solvent, e.g. petroleum hydrocarbons such as "Solvesso 150" (flash point 150° C.) marketed by Esso Standard Oil Co. This assures good flow properties and provides the relatively heavy wet film that is desired. The top coat is cured at 50–70° C. for 16–24 hours.

The chemistry of the film-forming reactions is not fully understood but it is believed that one or more of the following reactions link two or more of the polyurethane polyisocyanates in the film-forming process that occurs during the cure of the coating: Cross-linking reactions between excess diisocyanate and the urethane bridges of the polyurethane polyisocyanate to form allophanic ester linkages; formation of similar linkages between a terminal isocyanate in one polyurethane polyisocyanate and a urethane bridge in another such molecule; reactions between two terminal isocyanate groups to form uretidinedione linkages; reactions between three terminal isocyanate groups to form cyclic triisocyanurate linkages; and reactions between two terminal isocyanate groups and a molecule of water (absorbed from the atmosphere) to form a urea linkage. It also appears probably that terminal isocyanate groups present in the film-forming component react with active hydrogen present on the surfaces of the leather to form a direct chemical bond between the substrate and coating.

EXAMPLE

*Part A.—Preparation of Polyurethane Polyol Component*

The castor oil used in the example ("D B" oil marketed by Baker Castor Oil Co.) had an equivalent weight, hydroxyl group basis, of 345.

The tolylene diisocyanate used was a liquid mixture containing 80% of the 2,4-isomer and 20% of the 2,6-isomer.

Castor oil (1450 parts=4.21 hydroxyl group equivalents) was heated with agitation to 90° C. under an atmosphere of nitrogen gas. Tolylene diisocyanate (183 parts=2.1 isocyanate group equivalents) was added during a 30 minute period in which the temperature was maintained at 90° C. Toluene (180 parts) was then added during 10 minutes at 90° C. The batch was then heated to 110° C. and held thereat for a 4 hour period in which the reaction went to completion as evidenced by the fact that the viscosity of the product reached a maximum after 3½ hours and remained constant for ½ hour. The batch was then cooled to 25° C.

The resulting polyurethane polyol reaction product had a Gardner-Holdt viscosity of $Z_4$–$Z_5$ at 25° C. in toluene solution of 90% non-volatiles concentration. The reaction product had an equivalent weight (hydroxyl group basis) of 777, an average molecular weight (calculated) of 2700 and an average of 3.5 free hydroxyl groups per molecule.

The NCO/OH ratio of reactants used to make the product was 0.5. The average composition of the product was that corresponding to a polyurethane polyol containing 3 castor oil residues linked by 2 tolylene diisocyanate residues.

*Part B.—Preparation of Adduct From Polyurethane Polyol and Tolylene Diisocyanate*

The polyurethane polyol solution (90% non-volatiles in toluene), prepared as described in Part A, supra (665 parts=0.77 hydroxyl group equivalents) was heated with agitation to 30° C. under a nitrogen atmosphere. Tolylene diisocyanate (150=1.72 isocyanate group equivalents) and toluene (185 parts) were added rapidly. The batch was heated to 60° C. and charged with mixture of solvents comprising 80 parts of toluene and 70 parts of ethyl acetate. The batch was agitated at 60° C. under dry nitrogen for an additional 3 hours, cooled to 25° C. and stored free from contact with moisture.

The resulting adduct had the following composition and properties:

| | | |
|---|---|---|
| Non-volatiles | percent | 65 |
| Solvent composition of solvent | do | 35 |
| Toluene | do | 82.5 |
| Ethyl acetate | do | 17.5 |
| Amine equivalent, theoretical | do | 1,220 |
| Amine equivalent, measured | | *1200±50 |
| NCO/OH ratio: | | |
| Polyurethane polyol basis | | 2.23 |
| Overall basis | | 1.62 |

* Range given indicates reproducibility of analytical results.

*Part C.—Coating Leather With Prepolymer Adduct*

The adduct solution described in Part B was reduced to 20% non-volatiles content by addition of a mixed solvent containing 60% by weight of hexane and 40% by weight of ethyl acetate. A catalyst, dibutyl tin dilaurate marketed under the name "Stabilizer D-22" by Union Carbide Chemicals Co. and color, "National Azo Oil Black BT" (Colour Index No. 26150) marketed by National Aniline Division, Allied Chemical Corp., were added. The resulting composition was as follows:

| | Parts by weight |
|---|---|
| Prepolymer adduct solution (65% non-volatiles) | 100 |
| Hexane | 135 |
| Ethyl acetate | 45 |
| Catalyst ("Stabilizer D-22") | 0.2 |
| National Azo Oil Black Bt | 0.2 |

The composition was applied as a prime coat to a porous leather by spraying as a mist from a gun operated at about 15 p.s.i.g. air pressure. No more was applied than was required to form a continuous wet film. The coating was cured by heating at 60° C. for 4 hours.

A second coat was applied by repeating the procedure for the prime coat as described above. The surface of the leather was completely sealed by the two coatings.

For the top coat, the following formulation was used:

| | Parts by weight |
|---|---|
| Polymer adduct solution (65% non-volatiles) | 100 |
| "Solvesso 150" | 85 |
| Catalyst, "Stabilizer D-22" | 0.2 |

A heavier solvent, "Solvesso 150" (a higher boiling aromatic petroleum solvent marketed by Esso Standard Oil Co.) was used to provide better flow over the sealed surface. The non-volatiles content was higher than before because it was desired to lay down a relatively heavy wet film. The coating was applied as a mist at an air-gun pressure of 25 p.s.i.g. It was cured by heating for 16 hours at 60° C.

The resulting coating was tack-free, did not crack or craze after mechanical flexing for 10,000 cycles, did not fail after immersion in boiling water for 10 minutes and in acetone for 6 hours, did not crack after being flexed 1-3 times at —20° C. and had excellent hand, bleed resistance and adhesion and showed an aesthetically pleasing depth of gloss. To measure the mechanical properties of the film, a film of 3-5 mils thickness was cast on a mercury surface and cured. The resulting free film had the following properties:

| | |
|---|---|
| Tensile strength, p.s.i | 1631 |
| Elongation at break percent | 235 |
| Energy of rupture (inch lbs. per cubic inch) | 1950 |

Although certain preferred embodiments of the present invention have been disclosed for purpose of illustration, it will be evident that various changes and modifications may be made therein without departing from the scope and spirit of the invention.

I claim:

1. A method for producing polyurethane polyisocyanate film-forming composition adapted for use as a patent leather finish which comprises first producing a polyurethane polyol reaction product by heating a mixture of castor oil and organic diisocyanate in such proportions that the ratio of NCO groups to OH groups in the reactants is between 0.4 to 0.6 until the viscosity of the reaction mass rises to a maximum value which remains substantially unchanged on further heating, and then producing the polyurethane polyisocyanate film-forming composition by heating said polyurethane polyol reaction product with additional organic diisocyanate in such amount that the NCO/OH ratio of the polyurethane polyol-organic diisocyanate mixture is at least 2.0, until the reaction is substantially complete as determined by measuring the amine equivalent of the reaction mass and dissolving the reaction mass in an inert organic solvent.

2. A method of producing a patent leather finish on leather which comprises applying to leather a coat of the composition produced by the method claimed in claim 1 and containing an accelerating catalyst, curing said coat until set, thereafter applying another coat of the composition produced by the method claimed in claim 1 and containing an accelerating catalyst, and curing said latter coat until set.

3. A method for producing polyurethane polyisocyanate film-forming composition adapted for use as a patent leather finish which comprises first producing a polyurethane polyol reaction product by heating a mixture of castor oil and tolylene diisocyanate in such proportions that the ratio of NCO groups to OH groups in the reactants is between 0.4 to 0.6 until the viscosity of the reaction mass rises to a maximum value which remains substantially unchanged on further heating, and then producing the polyurethane polyisocyanate film-forming composition by heating said polyurethane polyol reaction product with additional tolylene diisocyanate in such amount that the NCO/OH ratio of the polyurethane polyol-organic diisocyanate mixture is at least 2.0, until the reaction is substantially complete as determined by measuring the amine equivalent of the reaction mass and dissolving the reaction mass in an inert organic solvent.

4. A method of producing a patent leather finish on leather which comprises applying to leather a coat of the composition produced by the method claimed in claim 3 and containing an accelerating catalyst, curing said coat until set, applying a second coat of the composition produced by the method claimed in claim 3 and containing an accelerating catalyst, curing said second coat until set, thereafter applying a third coat of the composition produced by the method claimed in claim 3 and containing an accelerating catalyst and curing said third coat until set.

References Cited in the file of this patent

UNITED STATES PATENTS

| 2,609,349 | Cass | Sept. 2, 1952 |
| 2,769,826 | Yoho | Nov. 6, 1956 |
| 2,955,958 | Brown | Oct. 11, 1960 |
| 2,994,674 | Rudkin et al. | Aug. 1, 1961 |
| 3,027,276 | Cohen et al. | Mar. 27, 1962 |
| 3,047,520 | Fiel | July 31, 1962 |

FOREIGN PATENTS

| 815,185 | Great Britain | June 17, 1959 |